United States Patent [19]
Meyerhoefer et al.

[11] 3,827,677
[45] Aug. 6, 1974

[54] HANGER DEVICE FOR PORTABLE MIXERS

[75] Inventors: Carl E. Meyerhoefer, Little Neck, N.Y.; Richard J. Naples, New Britain, Conn.

[73] Assignee: General Signal Corporation, New York, N.Y.

[22] Filed: Jan. 12, 1973

[21] Appl. No.: 323,331

[52] U.S. Cl.............. 259/104, 248/359, 248/360, 259/DIG. 35
[51] Int. Cl...... B01f 7/16, B01f 15/00, A47g 29/00
[58] Field of Search............ 259/51, 64, 65, 66, 67, 259/84, 85, 104, 106, 107, 108, 1 A, DIG. 28, DIG.29, DIG. 35, 102; 416/77, 122; 248/37.3, 37.6, 126, 359, 360

[56] References Cited
UNITED STATES PATENTS
| | | | |
|---|---|---|---|
| 2,793,011 | 5/1957 | Schwaneke | 259/104 |
| 2,804,288 | 8/1957 | O'Russa | 259/104 |
| 2,938,715 | 5/1960 | Farrell | 259/104 |

Primary Examiner—Harvey C. Hornsby
Assistant Examiner—Philip R. Coe
Attorney, Agent, or Firm—John F. Ohlandt

[57] ABSTRACT

A support device is disclosed for use with a portable food mixer or the like so that the mixer can be parked or camped alongside of or on the edge of a bowl or other vessel when it is not is use, whereby undesired dripping is avoided.

5 Claims, 5 Drawing Figures

PATENTED AUG 6 1974 3,827,677
FIG. 1
FIG. 2
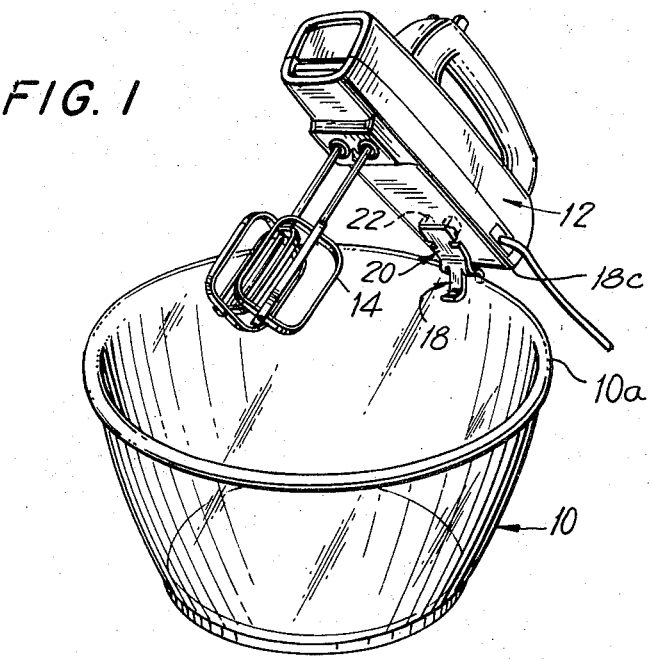
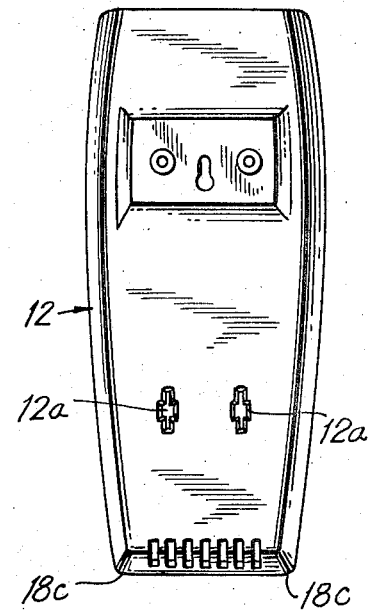
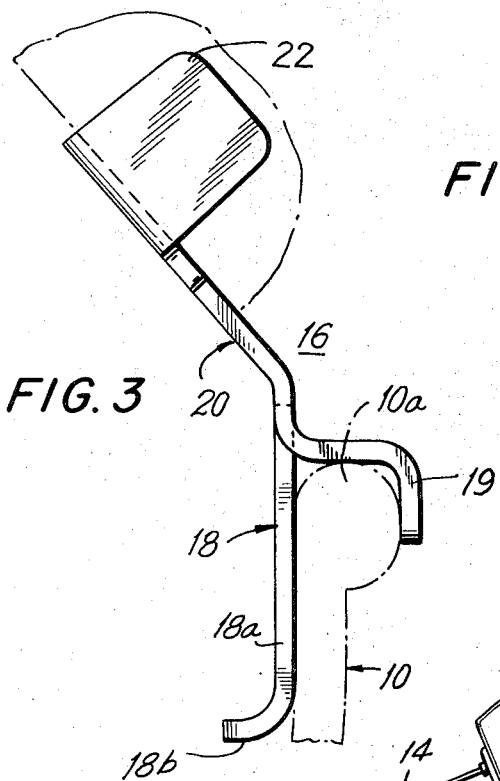
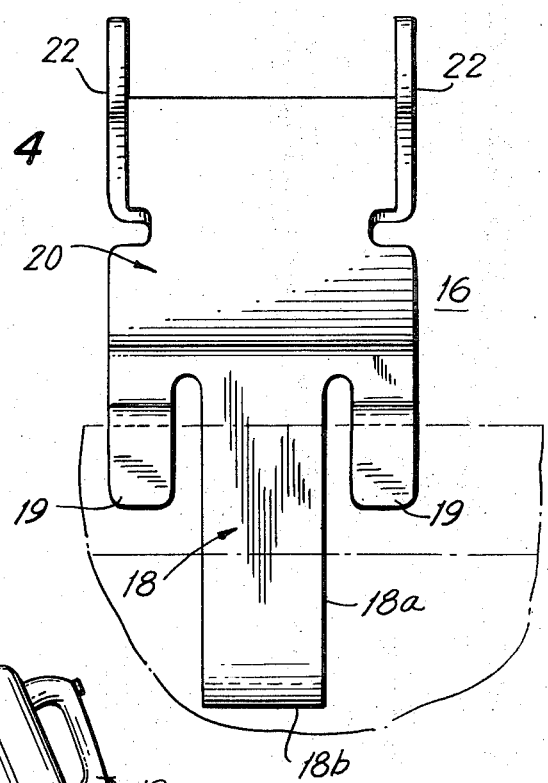
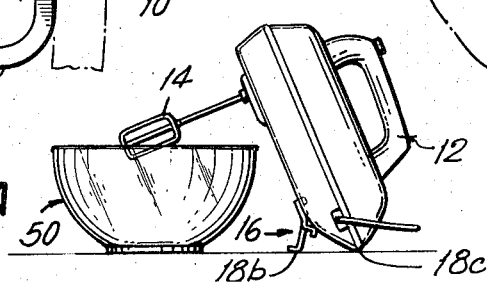
FIG. 3
FIG. 4
FIG. 1A

HANGER DEVICE FOR PORTABLE MIXERS

BACKGROUND OBJECTS AND SUMMARY OF THE INVENTION

The present invention pertains to support devices and more particularly to such a device uniquely adapted to place a portable food mixer in such a position as to avoid a problem which has occurred with previously known designs.

The portable food mixer has become a standard appliance in today's kitchen and is frequently applied to a variety of mixing tasks. Its great convenience stems from the fact that it can be used to mix foods in vessels other than bowls, such as cooking pots, double boilers, etc., on the stove or off, thus avoiding the inconvenience of having to pour the foods from bowls to pots and vice-versa. However, there has occurred a problem in the use of such a mixer if it is desired to stop the mixer for a moment while, for example, other ingredients are selected for the purpose of adding them to the mix. In such instances it has been common practice to stand a portable mixer on its end with the beaters extending over the bowl so that batter or any other material might drip into the bowl. Unfortunately, the center of gravity of a mixer is such that standing it on end results in a backward slanting of the beaters in such a way that batter or the like can flow down the stem of the beaters and run into the mixer, thus producing a messy and troublesome condition. In addition, it sometimes happens that the height of the particular bowl or pot being used is such that the mixer cannot be placed on its end and have the beaters extend over the vessel. As a result an inconvenient and messy condition exists, because of dripping on counters or other work places.

It is therefore a primary object of the present invention to provide a solution to the aforesaid problems and to provide such a solution in an efficient, economical and convenient way.

The present invention fulfills this object in that it provides an arrangement for a portable mixer which permits parking or camping the mixer either alongside of one of the smaller mixing bowls or attached on the edge of one of the larger bowls, such that the beaters of the mixer are positioned within the perimeter of the mixing bowl whereby the beater stems slant downwardly away from the mixer housing so that any dripping of batter or the like will be away from the housing and into the mixing bowl.

Other objects and further advantages of the present invention will be readily appreciated by reference to the following detailed description of a preferred embodiment, when considered in connection with the accompanying drawings.

BRIEF DESCRIPTION OF THE DRAWINGS

FIG. 1 is a perspective view and illustrates a portable mixer held in position over a mixing bowl by means of the device of the present invention.

FIG. 1a is a perspective view and illustrates a portable mixer with a tripod support for positioning the beaters of the mixer over a small mixing bowl.

FIG. 2 is an enlarged view of the undersurface of the portable mixer illustrating the holes therein adapted for reception of the support device.

FIG. 3 is a side view of the support device.

FIG. 4 is a front view of the support device of the present invention.

DESCRIPTION OF PREFERRED EMBODIMENT

Referring now to the various figures of the drawing, it will be seen that the support device provides a unique solution to the problem of preventing dripping of material from the beaters of the mixer onto sensitive parts. It will be appreciated that with the size of bowl 10 depicted in FIG. 1, it would be unavailing, even assuming that mixer 12 is suitable, to stand the mixer on end because in this case the beaters 14 would not reach above the height of the bowl 10 so that the beaters 14 could extend over the bowl opening. The present invention provides a support device 16 which enables positioning the mixer 12 in such a way that the beaters slant downwardly over the bowl opening and permit flow of the batter or other material into the bowl.

In FIG. 1a there is illustrated the use of the support device of the present invention in connection with a mixing bowl which is considerably smaller than the bowl 10 previously considered. Accordingly, rather than supporting the mixer on the edge of the small bowl 50, the same support device 16 is employed in a tripod-like arrangement with the lower edge of the mixer resting on a countertop or other convenient surface.

It will be seen by reference to FIG. 2 that the mixer 12 has in its undersurface a pair of holes or openings 12a. These holes or openings could have been specially provided for purposes of fulfilling the objects of the present invention. However, holes of this character have been previously known to be included in portable mixers for the purpose of mounting the mixer on a stand associated with the mixing operation. Thus the present invention recognizes that such holes already provided can conveniently be turned to effective use in connection with present purposes.

The detailed structure of the support device can be appreciated by reference to FIGS. 3 and 4 in which several views of the device are illustrated. It will be particularly noted that the device 16 comprises a lower bowl-engaging portion or member 18 and an upper member 20. In the preferred form illustrated the lower portion 18 is made up of a central section or tongue 18a which is on the longitudinal axis of the device and which is adapted to engage the inner surface of the mixing bowl and to extend downwardly to a significant distance inside the bowl. The end of tongue 18a is conveniently formed at right angles to provide a smooth pad 18b. Pad 18b serves as the third point of the tripod-like support when the mixer is parked as shown in FIG. 1a. Corners 18c of the mixer housing provide the other two points of the tripod support. A pair of ears 19 constitute the outer section of portion 18, being adapted to engage the rim 10a and the outer surface of the bowl 10.

It will be seen that the upper portion 20 of the support device is at an angular relationship with respect to the longitudinal axis of the lower portion 18, being inclined radially inwardly when in use with respect to the center of the bowl 10. The upper end of the portion 20 is conveniently provided with a pair of spaced prongs 22 which are designed to be received within the apertures 12a of the mixer when the mixer is brought into engagement with the support device. As a result of this engagement, that is, of the engagement of the prongs 22 within the apertures 12a, the mixer 12 is permitted to extend over the bowl and the beaters 14 are inclined downwardly and any residue of batter or the like remaining on the beaters will drip into the bowl. It will be understood, however, that prongs 22 may be omitted and that support device 16 may be attached to mixer 16 by means of rivets or screws without departing from the spirit of the invention.

The support device of the present invention can be made very economically and can be fabricated of a variety of materials, preferably being made of steel which has the desired strength resiliency.

What is claimed is:

1. In combination with a portable food mixer, comprising a hand-held body and a pair of beaters, for use with a mixing bowl supported on a counter,
    a support device, including means for connecting said device with said mixer, for positioning said beaters above said mixing bowl at a downward inclination,
    a lower portion of said device for either engaging the edge of said bowl, or defining with the lower corners of said mixer a tripod means for supporting said mixer on said counter,
    an upper portion of said device, integral with said lower portion, for defining said connecting means, said upper portion being fixedly inclined with respect to said lower portion at an angle complementary to the inclination of said beaters.

2. The combination as defined in claim 1, in which said upper portion of said device includes a pair of prongs adapted to fit into apertures within said mixer to provide detachable connection of said mixer to said support device.

3. The combination as defined in claim 1, in which said lower portion of the device includes a first section for contacting the inner surface of the bowl and, integral therewith, a second section extending in contact with the rim of the bowl and further extending downwardly in contact with the outer surface of the bowl.

4. The combination as defined in claim 3, in which said first section is located centrally on the longitudinal axis of the device, and in which said second section includes a pair of ears spaced laterally to either side of the first section.

5. The combination as defined in claim 4, in which the lower end of said first section, which extends downwardly into the bowl, is bent perpendicularly to said longitudinal axis so as to form a support pad.

* * * * *